(No Model.)
A. S. CORE.
CULTIVATOR TOOTH.
No. 267,739. Patented Nov. 21, 1882.
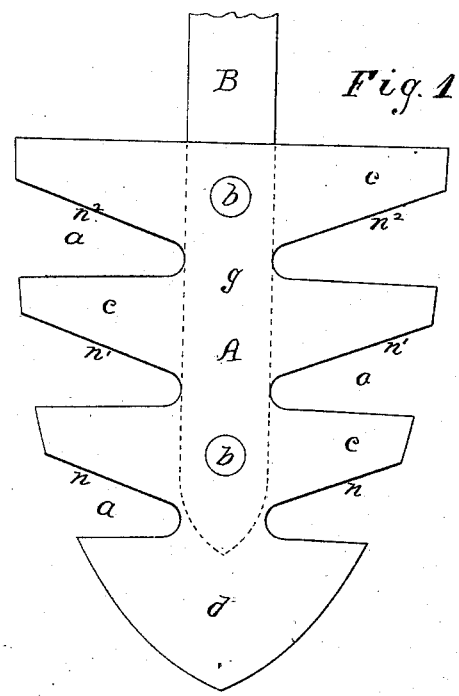
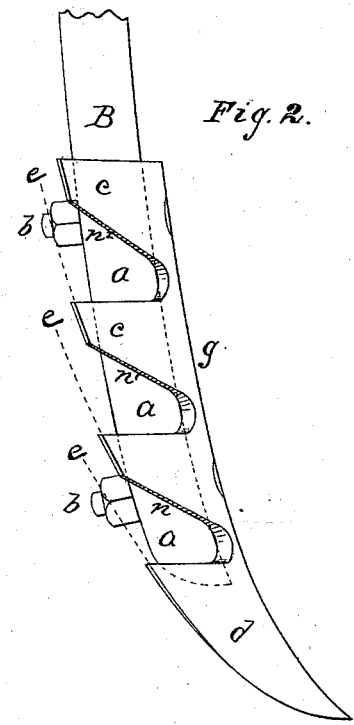
Attest:
M. A. Phillips.
Arthur S. Core
Inventor:
A. S. Core.
By E. B. Whitmore, Atty.

UNITED STATES PATENT OFFICE.

ARTHUR S. CORE, OF ROCHESTER, NEW YORK.

CULTIVATOR-TOOTH.

SPECIFICATION forming part of Letters Patent No. 267,739, dated November 21, 1882.

Application filed July 24, 1882. (No model.)

*To all whom it may concern:*

Be it known that I, ARTHUR S. CORE, of Rochester, in the county of Monroe and State of New York, have invented a new and useful Improvement in Cultivator-Teeth, which improvement is fully set forth in the following specification and accompanying drawings.

The object of my invention is to divide the sides of a cultivator-tooth of common form into laterally-projecting blades, and form said blades in such a manner that masses of earth and weeds moving upward along the face of the tooth during its advance through the soil will encounter the edges of the successive blades and be cut or broken up, the lower or cutting edges of said blades being inclined upward toward their respective free ends, so as to have a sliding or shearing cut upon the masses of earth and weeds as they are pressed upward and outward by the advance of the tooth, the tooth in its operation acting as a pulverizer of the soil.

In the drawings, Figure 1 is a front elevation of my improved cultivator-tooth; and Fig. 2, a side elevation of the same, viewed as indicated by the arrow.

A is the tooth, which in outline is of the form of a tooth commonly used on cultivators, and B the tooth-standard, reaching to and connected with the frame of the cultivator, the tooth being secured to the standard by means of bolts $b$, in the usual manner.

$a$ are notches cut in the opposite vertical edges of the tooth, dividing the latter into lateral blades $c$ and point $d$, as shown. The free ends of these blades are, with reference to the plane of each, arranged to overlap each other, either one being forward of the one next below—that is to say, by observing the dotted lines $e$ in Fig. 2 it will be seen that going in an upward direction the point $d$ is directed back of the blade $c$ next above it, and that each blade in turn is directed back of the one next above. On account of this arrangement of the blades the earth moving upward from the point $d$ while in operation will encounter the lower edge, $n$, of the lower blade, $c$, and that moving upward from said lower blade will meet the edge $n'$ of the middle blade, the edge $n^2$ of the upper blade receiving the earth directed upward from said middle blade. This tends to crumble the earth, and chunks of the same pressed against the edges of the blades are split and reduced in size. The various edges of the blades and point also form cutters for cutting the roots of weeds as the tooth is being urged through the soil. The roots reaching deeper in the ground are cut by the edges of the point $d$, while shallower roots are cut and torn by the edges of the intermediate blades, and surface roots by the edges of the upper blade. In consequence of the middle of the tooth at $g$ being formed in a vertical ridge, or made higher and in advance of the free ends of the blades, the roots of the weeds in moving upward are also carried laterally outward. This causes the edges of the blades to act upon them with a sliding cut, which renders the blades more effective in their operations upon the weeds.

I am aware that mold-boards of plows having notched or irregular edges have been used, and others having a part corresponding to the mold-board divided into spiral strips. Such forms, broadly, I do not claim.

I claim as my invention—

A cultivator-tooth formed with a point, $d$, and lateral blades $c$, extending obliquely at each side and back of a central ridge, $g$, of the tooth, the lower or cutting edges of said blades being inclined obliquely outward and upward for the purpose of giving a shearing cut to the same, and the plane of either blade passing in rear of the next blade above, substantially as shown and described.

ARTHUR S. CORE.

Witnesses:
   E. B. WHITMORE,
   M. M. NIER.